UNITED STATES PATENT OFFICE.

GEORGE WILLIAM BELDAM, OF EALING, ENGLAND.

ENGINE OR MACHINE PACKING AND METHOD OF MAKING THE SAME.

1,190,087.  Specification of Letters Patent.  Patented July 4, 1916.

No Drawing.  Application filed February 14, 1916. Serial No. 78,234.

*To all whom it may concern:*

Be it known that I, GEORGE WILLIAM BELDAM, a subject of the King of England, residing at Ealing, in the county of Middlesex, England, have invented new and useful Improvements in and Connected with Engine or Machine Packing and Methods of Making the Same, of which the following is a specification.

This invention has reference to engine or machine packing for making fluid tight joints, and specially for making joints between parts having movement, such as piston rods, and valve rods of steam and other engines, pumps, and the like; and the type of packing concerned is that known as soft or flexible packing, the base or body of which is mainly of textile fabric.

Now the primary object of the present invention is to provide a packing of the kind referred to, which is of a high quality, durable, and thoroughly efficacious and serviceable for uses where packings of the kind concerned are used, and, at the same time, is of relatively low cost, or inexpensive.

In many cases, employment of high class packings in an engine, such for instance as in "tramp" steamer engines, and in many other engines, is prohibitive on the ground of its high cost; and in cases, such as these, soft or flexible packings of an inferior quality and low cost are therefore used, the use of high class or quality, or high price canvas in such packings, being precluded. Further, in the making up of these packings, an adhesive is used to join the laminæ of which it is composed, together; and the demands of low price and cost render necessary, in this respect also, the use of a low quality and priced rubber solution, or some substitute, which relatively soon becomes hard or perishes, so that the packing becomes practically useless.

In the manufacture of the packing according to this invention, disused or old rubber impregnated or proofed canvas layers or strips, obtained by pulling apart the laminæ of casings or covers of old or used up self propelled vehicle pneumatic or equivalent tires, are applied to and employed for this purpose, the canvas of which is practically always of a very high quality, and it is moreover impregnated and proofed with rubber solution of a high quality.

These separated strips are then coated or proofed with a suitable rubber compound or mixture or like adhesive, or a high quality lubricant solution having strong adhesive power, and then rolled up and formed into packings and the like of known suitable shapes and sizes, and are serviceable for use as specified.

As the tire covers of self propelled vehicles possess the high qualities in respect of the canvas they are made of, and are impregnated with rubber of a high and durable quality, and as the price of worn out and disused tire covers is low, by this invention a packing is provided which is of low cost and cheap, and has all the advantages of the higher priced and class packings, and none of the disadvantages of the low priced and cheaper packings of the kind concerned, now supplied; while also the invention enables low priced packings to be stored for great lengths of time, without material deterioration; and such packings also have the quality of being impervious to steam and water, and are preserved by the rubber with which they are impregnated.

In some cases, the packing may be semi-vulcanized at such a temperature and pressure, which shall not affect the vulcanized canvas; but in most or many cases this operation is not necessary.

What is claimed is:—

1. A "soft" or "flexible" packing consisting of a plurality of adhered rubber impregnated canvas layers or strips being the separated layers or strips of casings or covers of old or used up self propelled vehicle pneumatic or equivalent tires; and the layers or strips of the packing being adhered together by an adhesive substantially as set forth.

2. The manufacture of the packing consisting in pulling apart the layers or strips of old or disused pneumatic tire casings or covers; coating or proofing these separated layers or strips with an adhesive; and then rolling or laying up the coated layers or strips upon one another into the form or shape of packing required; substantially as set forth.

3. A soft or flexible packing consisting of a plurality of adhered rubber impregnated canvas layers or strips being the separated layers or strips of casings or covers of old or used up self propelled vehicle pneumatic or equivalent tires, the layers or strips of the packing being adhered together by rubber compound or mixture or like adhesive, said packing being semi-vulcanized, substantially as described.

In testimony whereof I have signed my name to this specification in the presence of two subscribing witnesses.

GEORGE WILLIAM BELDAM.

Witnesses:
 EUSTACE H. BURKE,
 S. J. EARL.